March 26, 1940.    A. GLASER ET AL    2,195,245
ELECTRIC VALVE AND THE METHOD OF MANUFACTURING IT
Original Filed Jan. 26, 1937

Inventors
August Glasser
Werner Koch
Hans Neidhardt
Fritz Brunke
By Harry E. Dunham
Attorney Patented Mar. 26, 1940

2,195,245

UNITED STATES PATENT OFFICE 2,195,245

ELECTRIC VALVE AND THE METHOD OF MANUFACTURING IT

August Glaser, Berlin-Frohnau, Werner Koch, Berlin-Glienicke, Hans Neidhardt, Berlin, and Fritz Brunke, Berlin-Steglitz, Germany, assignors to General Electric Company, a corporation of New York Application January 26, 1937, Serial No. 122,432
Renewed August 24, 1939. In Germany February 4, 1936

15 Claims. (Cl. 175—366)

This invention relates to electric valves, especially dry rectifiers, that is to say, rectifier arrangements in which a layer of a semi-conducting material of, in most cases, crystalline structure is arranged between two metal plates. According to the magnitude of the voltage to be rectified a larger number of such cells is arranged in successive layers, the first and the last metal plate constituting the points of connection of the rectifier assembly to the circuit. The intensity of the current to be rectified determines the size of the contact surface between the electrode plates and the layer of the semi-conducting material.

Figures 1, 2:
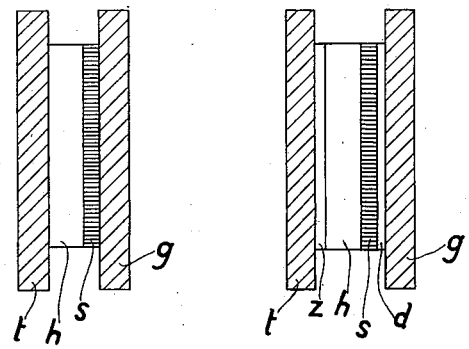
Figure 3:
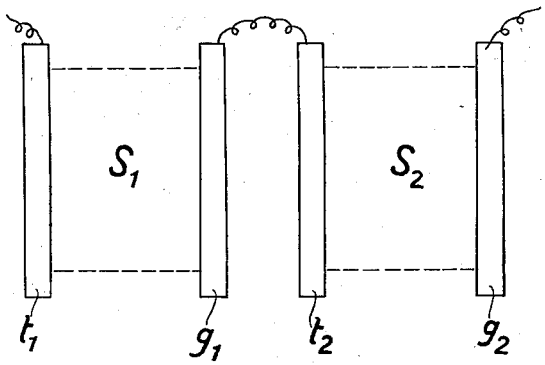
Figure 4:
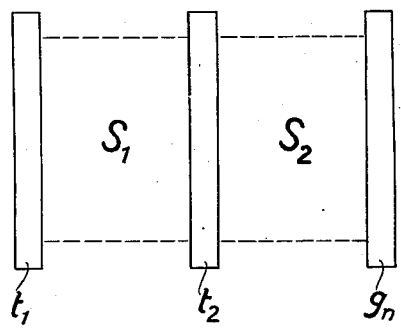

On the accompanying drawing Figure 1 is a side-view of a cell as hitherto constructed, the thickness of the members of which it is composed being, however, strongly exaggerated. Figure 2 is a similar representation, showing a cell designed according to the present invention. Figure 3 is a side-view of two separate modified cells connected with one another by a wire, and Figure 4 is a modification of Fig. 3, all as fully described hereinafter.

In order to make the invention completely clear, we refer first to Fig. 1, in which $h$ denotes the layer of the semi-conducting material which is firmly attached to one of the electrodes, viz. the carrier electrode $t$, whereas the other or counter-electrode $g$ is pressed against the semi-conducting layer $h$. This layer is formed on the electrode $t$ about in the same manner as is done in the manufacture of a cuprous oxide rectifier, or it may be formed thereon by melting the material upon said electrode, as is done, for instance, in the manufacture of selenium rectifiers. In some cases the layer $h$ may be pressed upon the electrode $t$ in the form of a crystalline mixture or may be baked thereon. It is obvious that the electrodes, as well as the layer of the semi-conducting material, arranged with respect to one another as above stated, should not have a lesser thickness than such as is rendered necessary by the manner of manufacturing said component parts of the cell, as well as by the requisite durability of the same, although for the rectifying action per se a considerably lesser thickness would be sufficient and is, concerning the semi-conducting layer, even desirable because of the smaller resistance loss.

In order to explain the valve action, a very thin layer $s$ able to block the current in the one direction is assumed to exist within or upon the layer $h$ of the semi-conducting material. In Fig. 1 the layer $s$ is assumed to be located at the boundary surface between the layer $h$ and the counter-electrode $g$. This position of the layer $s$ is assumed to exist, for instance, in selenium rectifiers, whereas in other rectifiers, for instance the cuprous oxide rectifier, the layer $s$ is supposed to be located in the boundary surface between the layer $h$ of the semi-conducting material and the carrier electrode $t$. It has, in fact, not been possible up to now to ascertain with certainty the actual position of said layer $s$. The requisite thickness of the said blocking layer $s$ is assumed to amount only to about $10^{-6}$ cm. The blocking layer forms, in general, spontaneously, as by a chemical conversion of the semi-conducting material with the adjacent electrode material or, perhaps, during the formation treatment to which the layer of the semi-conducting material is subjected in order to transform it into the active modification. The thickness of the other layers, or electrodes respectively, need be only $10^{-3}$ cm. or less solely with consideration to the rectifying action. In the constructional forms designed up to now that thickness has been exceeded, in most cases very considerably.

Owing to the manner of forming, and to the formation of the blocking layer as above described, there take place at the various surfaces chemical conversions controllable only with difficulty or not at all and which are able to exert an essential influence upon the properties of the valve cell, partly desired properties, partly not desired ones. In the case of the choice of an unsuitable material for the electrodes and for the semi-conducting layer there may form at a wrong place undesired counter-blocking layers, or alloys or compounds, able to change detrimentally the conductivity of the system in the working or blocking direction. Also the depth of the action of such undesirable chemical actions cannot be always easily and sufficiently controlled. For this reason the thickness of, for instance, the layer of the semi-conducting material has been chosen, in most cases, greater than would, per se, have been sufficient or necessary.

The present invention relates to an electric valve, especially a dry rectifying cell, in which the above-stated drawbacks are obviated. Further, the invention relates to particularly advantageous constructional forms and also to useful methods of manufacture for the cells; finally, the invention comprises advantageous adaptations of the cells to multi-cell rectifying sets and to entire rectifiers.

According to this invention, the electric valve is so designed that between the carrying electrode $t$ and the layer $h$ of semi-conducting material $h$ is arranged a thin intermediate layer of good conductivity, which is chemically neutral to said electrode $t$ and to the layer $h$. By means of this intermediate layer the hitherto uncontrollable chemical actions of material above mentioned is prevented with certainty. This is especially valuable in a rectifier, the blocking layer of which is located on the side of the counter-electrode, as, for instance, in selenium rectifiers. But also if the blocking layer is located on the side of the carrier electrode, the intermediate layer between it and this electrode is valuable, because a subsequent change of the blocking layer by a chemical action of the electrode material can no longer take place. There is, thus, obtained, on the one hand, a far greater range of choice in the selection of the carrier electrode metal, and on the other hand a greater constancy of the optional characteristics; the carrier electrode metal can now be chosen much more independently with regard to its costs, its mechanical properties, its weight, and the like.

Although the intermediate layer acts to particular advantage between the carrier electrode and the semi-conducting layer because of the particularly intimate contact with these parts of the cell, still, it is nevertheless a further advantageous development of the invention to provide also an intermediate layer of the kind stated between the semi-conducting layer $h$ and the counter-electrode $g$, viz. a similar thin layer of good conductivity which is chemically neutral relatively to the adjacent substances, irrespective of where the blocking layer is located. This second intermediate layer we term the covering layer.

It has already become known, it is true, to cover the free side of the semi-conducting layer of electric valves with a neutral layer chemically neutral with respect to the adjacent materials, for instance by rubbing graphite thereinto, but this layer is not a covering layer in the sense of the present invention, its purpose being merely to obtain a better contact between the semi-conducting layer and the counter-electrode.

Fig. 2 shows an electric valve designed according to this invention. In this figure, $t$ denotes the carrier electrode, $h$ the semi-conducting layer, $g$ the counter-electrode, and $s$ the blocking layer which is, in this case, arranged on that side of the layer $h$ which is located opposite the counter-electrode. Between the carrier electrode $t$ and the layer $h$ is provided, according to this invention, a thin conducting intermediate layer $z$, and between the layer $h$, or the blocking layer $s$ respectively, on the one hand and the counter-electrode on the other hand is provided a thin conducting covering layer $d$. The layers $z$ and $d$ are, as regards their chemical condition, neutral with respect to the adjacent substances. From what has been explained in the preceding paragraphs it appears that the position of the blocking layer is perfectly immaterial as regards the present invention and its advantageous action. The layers $z$ and $d$ may, therefore, be located, for instance, also on the left-hand side of the semi-conducting layer in Fig. 2, and the covering layer might in many cases be dispensed with.

If an intermediate layer $z$ and a covering layer $d$ are provided respectively on opposite sides of the semi-conducting layer $h$, under certain circumstances, a blocking layer $s$ may not form spontaneously and it must then be produced in a separate process. This is not, however, a disadvantage but, counter thereto, an advantage, in that in such a case the thicknesses of the blocking layers can be accurately determined, their development can be controlled, and it is rendered possible to maintain them in unchanged state. The layers $zhsd$ will, therefore, be produced, as much as possible, in separate working processes and their thickness will only be such as rendered necessary with consideration of the blocking action and the disruptive strength, viz. solely with regard to the most favorable electric properties. Particularly good results have been obtained with layers of the semi-conducting material having a thickness of from 4 to $5 \times 10^{-4}$ cm., whereas the intermediate layer and the covering layer may even be still thinner, viz. about $10^{-6}$ cm.

In a constructional example made for investigating purposes the component parts of the cell were designed as follows: The carrier electrode $t$ and the counter-electrode $g$ consisted of sheet-copper of about 1 mm. thickness and the semi-conducting layer $h$ consisted of selenium and had a thickness of from 1 to 2 thousandths of 1 mm. The blocking layer $s$ was formed by selenium-dioxide, its thickness amounted to about $10^{-5}$ mm., and it was applied to that side of the semi-conducting layer $h$ which was located next the counter-electrode $g$. The intermediate layer $z$ between the carrier electrode $t$ and the selenium semi-conducting layer $h$ was formed by a layer of bismuth which had a thickness of about $10^{-4}$ mm., the bismuth being chemically neutral to copper, as well as to selenium; finally, a layer of tin $d$ of likewise $10^{-4}$ mm. thickness was provided as a chemically neutral covering layer between the blocking layer of selenium-dioxide and the counter-electrode.

Such thin layers can be made particularly easily by depositing the substance concerned under vacuo upon the carrier electrode. It may also be suited to the purpose in view to heat the carrier-electrode during this procedure to such a temperature that the substance forming the intermediate layer can diffuse a little into the surface of the carrier electrode whereby a particularly good adhesion of this substance to said electrode is attained. It is likewise suited to the purpose in view to maintain the carrier electrode at such a temperature while the layer of semi-conducting material is being applied thereto that said layer assumes at once the crystalline modification most favorable for the rectification.

Valves designed according to this invention and manufactured according to the methods described present particular advantages when the rectifying cell is employed for the manufacture of entire rectifying sets. Since the layer thicknesses, despite the addition of the intermediate layer and the cover layer, when used, may be maintained in their entirety much smaller than heretofore, the problem of conduction of heat losses through the layers is rendered much simpler, the more, as the layers $z$ and $d$, being good conductors of electricity, are also good conductors of heat. Further, owing to the slight thickness of the layer of the semi-conducting material, the arising heat loss can be reduced to a minimum. It is, therefore, possible to dispense with separate cooling plates and to deposit, by the vaporizing process, a set of rectifying cells, comprising quite a number of such cells in series, upon one carrier electrode without the insertion of cooling plates. In such a case the covering layer of a cell may constitute at the same time the carrier electrode of the next cell. Therefore, only the carrier electrode of the first cell and the counter-electrode of the last cell of the set (first or initial electrode and last or end electrode) need be designed as solid metallic disks, which then serve, at the same time, as supporting frames for the set of rectifiers and give them stability, and serve, furthermore, as supply electrodes. Finally, they may be designed as cooling plates.

Referring now to Fig. 3, $S_1$ and $S_2$ are enclosures intended to represent rectifier sets, of which $t_1$ $t_2$ are the carrier electrodes and $g_1$ $g_2$ the counter-electrodes pertaining to said sets. The sets are connected with one another in series by a wire, as shown. If it is desired to connect two or more such sets in series in one rectifier, it is even possible to dispense with the counter-electrodes, save that of the last set, in that, as in Fig. 4, the carrier electrode of the second set, of the third set, and so on, is pressed against the last covering layer of the preceding set, in which case only one counter electrode $g_n$ is necessary as end electrode.

If the cell layers are produced upon the carrier electrodes $t$ by depositing them by vaporization in vacuo, it is suitable to carry out this procedure in such a manner that all steps of the process are carried out in one suitably designed vacuum vessel, in which the several steps can, perhaps, be carried out successively in successive compartments, through which the carrier electrode is travelling. It may then be found convenient to effect the feed of the electrodes through the compartments and the individual procedures in the same either manually or automatically, or to operate partly in the one manner and partly in the other. The vacuum vessel may contain a rotary table on which the electrodes are carried round through the consecutive compartments, the requisite steps of the process being carried out while said table with the electrodes thereon performs one complete revolution. When a carrier electrode is to receive a set of valve cells or rectifying cells comprising a relatively large number of such cells, the number of revolutions of the rotary table must correspond with the number of said cells.

We claim:

1. The combination with an electric valve of the dry rectifier type having a copper carrier electrode, a counter electrode, and a layer of selenium arranged between said electrodes, of a thin intermediate layer of bismuth arranged between said carrier electrode and said selenium layer.

2. The combination with an electric valve of the dry rectifier type having a copper carrier electrode, a counter electrode, and a layer of selenium arranged between said electrodes, of a thin intermediate layer of bismuth arranged between said carrier electrode and said selenium layer, and a thin covering layer of tin arranged between said selenium layer and said counter electrode.

3. The combination with an electric valve of the dry rectifier type having a copper carrier electrode, a counter electrode, and a layer of selenium arranged between said electrodes, of a blocking layer of selenium dioxide on the free surface of said selenium layer and a thin intermediate layer of tin arranged between said blocking layer and said counter electrode.

4. The method of manufacturing a dry rectifier cell comprising a copper carrier electrode, a counter electrode, a layer of selenium between said electrodes, an intermediate layer of bismuth between said carrier electrode and said selenium layer, a blocking layer of selenium dioxide on said selenium layer, and a covering layer of tin between said blocking layer and one of said electrodes, which includes forming said layers in separate operations and only to such thickness as is required by the rectifying action of said cell.

5. The method of manufacturing a dry rectifier cell comprising a copper carrier electrode, a counter electrode, a layer of selenium between said electrodes, an intermediate layer of bismuth between said carrier electrode and said selenium layer, a blocking layer of selenium dioxide on said selenium layer, and a covering layer of tin between said blocking layer and one of said electrodes, which includes forming said layers in separate operations by vaporization and only to such thickness as is required by the rectifying action of said cell.

6. The method of manufacturing a dry rectifier cell comprising a copper carrier electrode, a counter electrode, a layer of selenium between said electrodes, an intermediate layer of bismuth, a blocking layer of selenium dioxide on said selenium layer, and a covering layer of tin between said blocking layer and one of said electrodes, which includes forming said layers in separate operations by vaporization in vacuo and only to such thickness as is required by the rectifying action of said cell.

7. The method of manufacturing a dry rectifier cell comprising a copper carrier electrode, a counter electrode, a layer of selenium between said electrodes, an intermediate layer of bismuth between said carrier electrode and said selenium layer, a blocking layer of selenium dioxide on said selenium layer, and a covering layer of tin between said blocking layer and one of said electrodes, which includes forming said layers in separate operations and only to such thickness as is required by the rectifying action of said cell, and heating said carrier electrode to such temperature during the operation of forming said layer of semi-conducting material thereon that a portion of said semi-conducting material diffuses into said carrier electrode.

8. The method of manufacturing a dry rectifier cell comprising a copper carrier electrode, a counter electrode, a layer of selenium between said electrodes, an intermediate layer of bismuth between said carrier electrode and said selenium layer, a blocking layer of selenium dioxide on said selenium layer, and a covering layer of tin between said blocking layer and one of said electrodes, which includes forming said layers in separate operations and only to such thickness as is required by the rectifying action of said cells, and heating said carrier electrode to such temperature during the operation of forming said layer of semi-conducting material thereon that said last-named layer assumes at once its crystalline modification most suitable for rectification.

9. The method of manufacturing a dry rectifier cell comprising a copper carrier electrode, a counter electrode, a layer of selenium between said electrodes, an intermediate layer of bismuth between said carrier electrode and said selenium layer, a blocking layer of selenium dioxide on said selenium layer, and a covering layer of tin between said blocking layer and one of said electrodes, which includes providing a single vacuum vessel, and applying all of said layers to said carrier electrode in said vessel in such a manner that said carrier electrode passes successively through successive compartments of said vessel and that the operations of forming said layers are carried out successively in said compartments.

10. The method of manufacturing a dry rectifier cell comprising a copper carrier electrode, a counter electrode, a layer of selenium between said electrodes, an intermediate layer of bismuth between said carrier electrode and said selenium layer, a blocking layer of selenium dioxide on said selenium layer, and a covering layer of tin between said blocking layer and one of said electrodes, which includes providing a single vacuum vessel, and applying all of said layers to said carrier electrode in said vessel in such a manner that said carrier electrode is passed manually successively through successive compartments of said vessel and that the operations of forming said layers are carried out successively in said compartments.

11. The method of manufacturing a dry rectifier cell comprising a copper carrier electrode, a counter electrode, a layer of selenium between said electrodes, an intermediate layer of bismuth between said carrier electrode and said selenium layer, a blocking layer of selenium dioxide on said selenium layer, and a covering layer of tin between said blocking layer and one of said electrodes, which includes providing a single vacuum vessel, and applying all of said layers to said carrier electrode in said vessel in such a manner that said carrier electrode is passed automatically successively through successive compartments of said vessel and that the operations of forming said layers are carried out successively in said compartments.

12. The method of manufacturing a dry rectifier cell comprising a copper carrier electrode, a counter electrode, a layer of selenium between said electrodes, an intermediate layer of bismuth between said carrier electrode and said selenium layer, a blocking layer of selenium dioxide on said selenium layer, and a covering layer of tin between said blocking layer and one of said electrodes, which includes providing a single vacuum vessel, providing a rotatable table within said vessel, mounting said carrier electrode on said table, and performing during one complete revolution of said table all operations requisite for forming said layers on said carrier electrode to produce said cell.

13. A rectifier comprising a series of groups of dry rectifier cell elements, each group being constituted by a thin selenium layer having on one side thereof a thin intermediate layer of bismuth and on the other side thereof a thin covering layer of tin, a copper carrier electrode in contact with the intermediate layer of the first of said groups, and a counter electrode in contact with the covering layer of the last of said groups, said electrodes being of relatively large dimensions and of relatively great mechanical stability whereby said electrodes may be utilized as current conductors and mechanical supports for said rectifiers.

14. A plurality of rectifiers connected in series, each rectifier comprising a series of groups of dry rectifier cell elements, each group being constituted by a thin selenium layer having on the opposite sides thereof a thin intermediate layer of bismuth and a thin covering layer of tin, and a copper carrier electrode in contact on one side thereof with the intermediate layer of the first of said groups, the carrier electrodes of the second and following rectifiers of said plurality of rectifiers being in contact respectively with the last covering layer of the preceding rectifier, the last rectifier of said plurality of rectifiers including a counter electrode in contact with the covering layer of the last group of elements of said last rectifier.

15. A plurality of rectifiers connected in series, each rectifier comprising a series of groups of dry rectifier cell elements, each group being constituted by a thin selenium layer having on the opposite sides thereof a thin intermediate layer of bismuth and a thin covering layer of tin, and a copper carrier electrode in contact on one side thereof with the intermediate layer of the first of said groups, the carrier electrodes of the second and following rectifiers of said plurality of rectifiers being in contact respectively with the last covering layer of the preceding rectifier, the last rectifier of said plurality of rectifiers including a counter electrode in contact with the covering layer of the last group of elements of said last rectifier, said electrodes being of relatively large cooling surface.

AUGUST GLASER.
WERNER KOCH.
FRITZ BRUNKE.
HANS NEIDHARDT.